(12) United States Patent
Stringham et al.

(10) Patent No.: US 9,473,738 B2
(45) Date of Patent: *Oct. 18, 2016

(54) COMMUNICATION SYSTEMS, COMMUNICATION ENDPOINTS, AND RELATED METHODS FOR REMOTELY CONTROLLING COMMUNICATION ENDPOINTS

(71) Applicant: Sorenson Communications, Inc., Salt Lake City, UT (US)

(72) Inventors: Doug Stringham, Springville, UT (US); Jonathan Roberts, Sandy, UT (US); Kevin Rittenhouse, Albuquerque, NM (US)

(73) Assignee: Sorenson Communications, Inc., Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/660,683

(22) Filed: Mar. 17, 2015

(65) Prior Publication Data
US 2016/0277709 A1    Sep. 22, 2016

(51) Int. Cl.
*H04N 7/14* (2006.01)
*H04M 3/42* (2006.01)

(52) U.S. Cl.
CPC ......... *H04N 7/147* (2013.01); *H04M 3/42391* (2013.01)

(58) Field of Classification Search
CPC combination set(s) only.
See application file for complete search history.

(56) References Cited

U.S. PATENT DOCUMENTS

| 5,619,555 | A | 4/1997 | Fenton et al. |
| 6,094,213 | A | 7/2000 | Mun et al. |
| 6,141,545 | A | 10/2000 | Begeja et al. |

(Continued)

FOREIGN PATENT DOCUMENTS

| EP | 2104324 A2 | 9/2009 |
| EP | 2369883 A1 | 9/2011 |

(Continued)

OTHER PUBLICATIONS

Z-20 User Guide.

(Continued)

*Primary Examiner* — Joseph J Nguyen
*Assistant Examiner* — Phung-Hoang J. Nguyen
(74) *Attorney, Agent, or Firm* — TraskBritt

(57) ABSTRACT

Communication systems, video endpoints, and related methods are described. A video endpoint is configured to receive commands corresponding to functions of the video endpoint from a mobile electronic device responsive to a user interacting with a remote control interface of the mobile electronic device. The functions include in-call functions. A method includes performing the functions responsive to receiving the commands from the mobile electronic device. A method of transforming a mobile electronic device into a remote control device for the video endpoint includes storing computer-readable instructions at one or more servers. The computer-readable instructions are configured to instruct the mobile electronic device to provide the remote control interface and transmit the commands to the video endpoint. A communication system includes a software distribution server including a data storage device including the computer-readable instructions, and one or more communication elements configured to transmit the computer-readable instructions to the mobile electronic device.

21 Claims, 4 Drawing Sheets

(56) References Cited

U.S. PATENT DOCUMENTS

| | | | |
|---|---|---|---|
| 6,571,094 B1 | 5/2003 | Begeja et al. | |
| 7,194,259 B2 | 3/2007 | DeLine | |
| 7,404,001 B2 | 7/2008 | Campbell et al. | |
| 7,515,905 B2 | 4/2009 | Begeja et al. | |
| 7,526,763 B2 | 4/2009 | Kim | |
| 7,689,232 B1 | 3/2010 | Beyer, Jr. | |
| 8,289,900 B2 | 10/2012 | DuMas et al. | |
| 9,197,745 B1* | 11/2015 | Chevrier | H04M 3/42391 |
| 2004/0081136 A1 | 4/2004 | Brown et al. | |
| 2005/0094777 A1 | 5/2005 | McClelland | |
| 2005/0267876 A1 | 12/2005 | Watanabe et al. | |
| 2005/0283813 A1* | 12/2005 | Jamail | H04M 3/5315 |
| | | | 725/109 |
| 2006/0172709 A1* | 8/2006 | Eyer | H04L 51/38 |
| | | | 455/90.3 |
| 2006/0285652 A1* | 12/2006 | McClelland | H04M 3/42391 |
| | | | 379/52 |
| 2007/0057912 A1* | 3/2007 | Romriell | G06F 3/017 |
| | | | 345/156 |
| 2007/0064097 A1* | 3/2007 | Cupal | H04M 3/42391 |
| | | | 348/14.16 |
| 2007/0232342 A1 | 10/2007 | Larocca | |
| 2008/0037748 A1 | 2/2008 | Jefferson et al. | |
| 2008/0273079 A1 | 11/2008 | Campbell et al. | |
| 2008/0288494 A1 | 11/2008 | Brogger et al. | |
| 2010/0246571 A1 | 9/2010 | Geppert et al. | |
| 2011/0142221 A1 | 6/2011 | Tofighbakhsh et al. | |
| 2011/0199915 A1 | 8/2011 | Santhanam et al. | |
| 2011/0238496 A1* | 9/2011 | Gurbuxani | G06Q 30/02 |
| | | | 705/14.49 |
| 2012/0028618 A1 | 2/2012 | Goel et al. | |
| 2012/0095749 A1 | 4/2012 | Capretta | |
| 2012/0196580 A1* | 8/2012 | Simmons | H04M 1/57 |
| | | | 455/415 |
| 2012/0257756 A1 | 10/2012 | Huang et al. | |
| 2012/0269331 A1* | 10/2012 | Harris | H04M 7/003 |
| | | | 379/52 |
| 2012/0296756 A1 | 11/2012 | Shah | |
| 2012/0314849 A1 | 12/2012 | LeBlanc et al. | |
| 2012/0315972 A1* | 12/2012 | Olson | A63F 13/02 |
| | | | 463/17 |
| 2013/0010708 A1 | 1/2013 | Abraham et al. | |
| 2014/0100899 A1 | 4/2014 | Boudville | |
| 2014/0267579 A1 | 9/2014 | Montero et al. | |
| 2014/0267580 A1 | 9/2014 | Parent et al. | |
| 2014/0270100 A1 | 9/2014 | Barton et al. | |
| 2014/0272814 A1 | 9/2014 | Parent et al. | |
| 2014/0280562 A1 | 9/2014 | Shields | |
| 2014/0282041 A1 | 9/2014 | Walker et al. | |
| 2014/0282095 A1 | 9/2014 | Walters et al. | |
| 2014/0282888 A1 | 9/2014 | Brooksby et al. | |
| 2014/0358951 A1* | 12/2014 | Luna | H04L 51/32 |
| | | | 707/758 |

FOREIGN PATENT DOCUMENTS

| | | |
|---|---|---|
| WO | 0030374 A2 | 5/2000 |
| WO | 2005101757 A1 | 10/2005 |
| WO | 2008124447 A1 | 10/2008 |

OTHER PUBLICATIONS

INUMBER User Guide The Z.
INUMBER Quick Start Guide.
U.S. Appl. No. 14/075,968, entitled Apparatuses and Methods for Operating a Communication System in One of a Tone Mode and a Text Mode filed Nov. 8, 2013.
U.S. Appl. No. 14/543,706, entitled Video Endpoints and Related Methods for Transmitting Stored Text to Other Video Endpoints filed Nov. 17, 2014.

\* cited by examiner

COMMUNICATION SYSTEMS, COMMUNICATION ENDPOINTS, AND RELATED METHODS FOR REMOTELY CONTROLLING COMMUNICATION ENDPOINTS

FIELD

Embodiments of the disclosure relate to systems and methods for controlling communication systems and, more particularly, to systems and methods for controlling communication systems for audibly impaired users.

BACKGROUND

Conventionally, communication systems for audibly impaired (e.g., deaf, hard of hearing, speech impaired, or combinations thereof) users include a variety of communication endpoints and services. By way of example, Sorenson Communications® offers the Ntouch® VP videophone and the VP-200 videophone that utilize the Sorenson Video Relay Service,® a service that provides sign language interpretation to audibly impaired video phone users.

These, and other similar communication endpoints, conventionally enable users to control their functions through their own integrated user interfaces. Infrared remote control devices are sometimes provided to enable the user to navigate the integrated user interfaces. Certain inconveniences, however, are inherent with these infrared remote control devices. For example, it can be awkward and cumbersome to provide textual inputs using an infrared remote control device. Also, it can be difficult to keep track of these remote control devices, which are often needed most right when they cannot be found.

BRIEF SUMMARY

In some embodiments, disclosed is a video endpoint configured to enable an audibly impaired user to participate in a communication session. The video endpoint includes one or more communication elements configured to receive, through a private network, commands corresponding to functions of the video endpoint from a mobile electronic device. The mobile electronic device is located at a same near-end location as the video endpoint. The commands are received responsive to a user of the video endpoint interacting with a remote control interface of the mobile electronic device. The functions include in-call functions of the video endpoint during a communication session with a far-end communication endpoint. The video endpoint also includes control circuitry configured to execute the functions of the video endpoint that correspond to the commands responsive to receiving the commands from the mobile electronic device.

In some embodiments, disclosed is a method of operating a video endpoint configured to enable an audibly impaired user of the video endpoint to participate in communication sessions. The method includes communicating with a mobile electronic device in a same near-end location as the video endpoint through a private network. The method also includes receiving commands from the mobile electronic device responsive to a user of the video endpoint interacting with a remote control interface of the mobile electronic device. The commands correspond to functions of the video endpoint. The functions include in-call functions of the video endpoint. The method further includes performing the functions corresponding to the commands from the mobile electronic device responsive to receiving the commands.

In some embodiments, disclosed is a method of transforming a mobile electronic device into a remote control device for a video endpoint configured to participate in communication sessions for audibly impaired users. The method includes storing computer-readable instructions on a data storage device of one or more servers. The computer-readable instructions are configured to instruct a processing element of a mobile electronic device to provide a remote control interface for controlling functions of the video endpoint, the functions including in-call functions. The computer-readable instructions are also configured to instruct the processing element to transmit commands corresponding to the functions to the video endpoint through a private network. The method also includes transmitting the computer-readable instructions to the mobile electronic device.

In some embodiments, disclosed is a communication system for audibly impaired users. The communication system includes a software distribution server. The software distribution server includes a data storage device including computer-readable instructions configured to instruct a processing element of a mobile electronic device to provide a remote control interface configured to enable a user of a video endpoint to control functions of the video endpoint by interacting with the remote control interface. The functions include in-call functions. The computer-readable instructions are also configured to instruct the processing element of the mobile electronic device to transmit commands corresponding to the functions to the video endpoint. The software distribution server also includes one or more communication elements configured to transmit the computer-readable instructions to the mobile electronic device.

In some embodiments, disclosed is a video phone configured to enable an audibly impaired user to participate in video communication sessions. The video phone includes one or more communication elements. The one or more communication elements are configured to transmit and receive video communications to and from a video relay service. The video relay service is configured to provide translation services for translating the video communications from the video phone to voice communications to enable the audibly impaired user of the video phone to participate in communication sessions with audibly capable users of audio endpoints. The one or more communication elements are also configured to transmit and receive video communications to and from other video phones operated by other audibly impaired users. The one or more communication elements are further configured to receive, through a radio frequency wireless personal area network, commands corresponding to in-call functions of the video phone from a mobile electronic device responsive to a user of the video phone interacting with a remote control graphical user interface of the mobile electronic device. The mobile electronic device is located at a same near-end location as the video phone. The video phone also includes control circuitry configure to execute the in-call functions of the video endpoint that correspond to the commands responsive to receiving the commands from the mobile electronic device.

DETAILED DESCRIPTION

Figure 1:
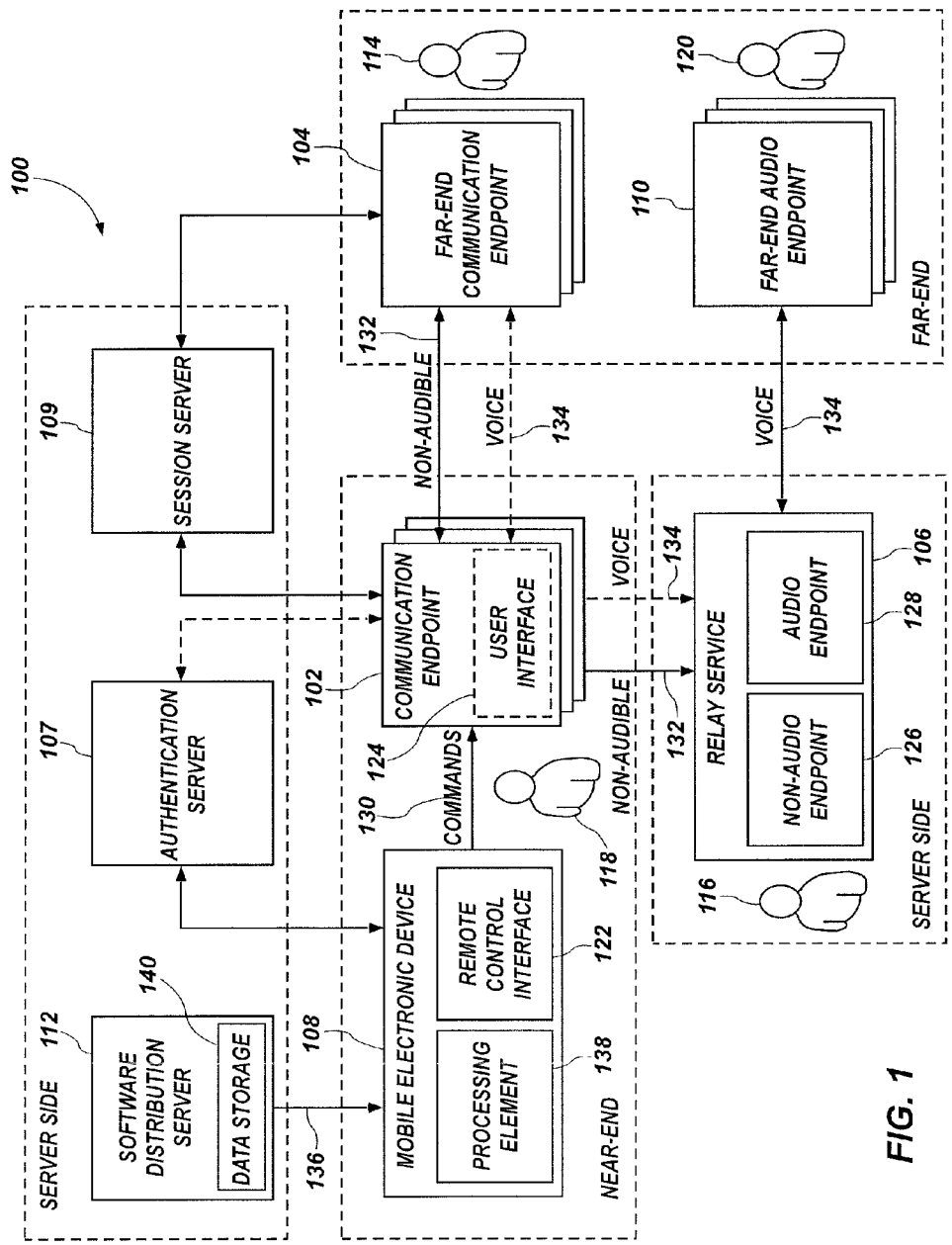
FIG. 1 is a simplified block diagram of a communication system according to embodiments of the disclosure.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

The disclosure also provides meaningful limitations in one or more particular technical environments that go beyond an abstract idea. For example, embodiments of the disclosure provide improvements in the technical field of communications involving audibly-impaired people. In addition, embodiments of the disclosure improve the functionality of communication devices themselves. In particular, embodiments of the disclosure enable users of communication endpoints configured to participate in communication sessions for audibly impaired users to remotely control functions of the communication endpoints using mobile electronic devices.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of include systems and methods for controlling communication systems for audibly-impaired users. It should be noted that while the utility and application of the various embodiments are described with reference to an audibly impaired environment, the disclosure also finds application to any environment where control over one or more communication devices may be helpful or desirable.

The term "call" refers to a communication session between communication endpoints. The term "incoming call" refers to an incoming request for a communication session to a communication endpoint such as a video endpoint. These communication sessions should be considered to include communications such as, voice communications, text communications, video communications, or combinations thereof.

FIG. 1 is a simplified block diagram of a communication system 100 according to embodiments of the disclosure. The communication system 100 may include at least one communication endpoint 102 (sometimes referred to simply herein as "communication endpoint" 102) and a mobile electronic device 108. The mobile electronic device 108 (e.g., a smartphone, a tablet computer, a laptop computer, etc.) may include a remote control interface 122 (e.g., a remote control mobile software application, or "app") configured to enable a user 118 to control functions of the communication endpoint 102 by interacting with the remote control interface 122 of the mobile electronic device 108. The mobile electronic device 108 may be configured to send command signals 130 (sometimes referred to herein as "commands" 130) corresponding to the functions to the communication endpoint 102 responsive to the user 118 of the communication endpoint 102 interacting with the remote control interface 122. The communication endpoint 102 may be configured to execute the functions responsive to receiving the commands 130 from the mobile electronic device 108.

By way of non-limiting example, the functions of the communication endpoint 102 that the remote control interface 122 enables the user 118 to control may include in-call functions. As used herein, the term "in-call functions" refers to functions performed by the communication endpoint 102 at the direction of the near-end user 118 of the communication endpoint 102 during communication sessions between the communication endpoint 102 and either far-end communication endpoints 104 or far-end audio endpoints 110. In other words, "in-call functions" include user-controllable functions that may be performed by the communication endpoint 102 during communication sessions. In embodiments where the communication endpoint 102 includes a video endpoint, the in-call functions may include video display and video capture functions (e.g., pan, zoom, saturation, brightness, and color adjustment options, camera activation and deactivation, etc.). In embodiments where the communication endpoint 102 includes a text-captioned endpoint, the in-call functions may include text input and display functions. Also by way of non-limiting example, the functions of the communication endpoint 102 that the remote control interface 122 enables the user 118 to control may include relay service functions (e.g., assistance request functions, relay service interaction functions, etc.).

In some embodiments, the functions of the communication endpoint 102 that the remote control interface 122 enables the user 118 to control may further include placing calls to and handling calls received from far-end communication endpoints 104, far-end audio endpoints 110, or a combination thereof. U.S. Patent Publication No. 2014/0282888 to Brooksby et al. (hereinafter referred to as "Brooksby"), filed Mar. 14, 2013, the entire disclosure of which is hereby incorporated herein by this reference, discloses a portable communication device configured to control functions of a video phone, the functions including placing outgoing calls from, and handling incoming calls to the video phone. Brooksby also discloses that the functions of the video phone that are controllable by the portable communication device include a function that transfers ongoing calls the video phone is participating in from the video phone to another video phone. The functions of the communication endpoint 102 that the remote control interface 122 enables the user 118 to control may include additional functions similar to those disclosed by Brooksby. In other words, in addition to the in call functions disclosed herein, the remote control interface 122 may enable the user 118 to control additional functions of the communication endpoint 102 including, for example, placing and receiving calls, and transferring an ongoing call that the communication endpoint 102 is participating in from the communication endpoint 102 to another communication endpoint 102 located at the near-end.

The communication system 100 may also include a software distribution server 112. The software distribution server 112 may be configured to store computer-readable instructions 136 in a data storage device 140 of the software distribution server 112. The software distribution server 112 may be configured to transmit the computer-readable instructions 136 to the mobile electronic device 108, where the computer-readable instructions 136 may be stored temporarily, permanently, or a combination thereof (e.g., in random access memory (RAM), system data storage, removable storage, cloud storage, etc.) The computer-readable instructions 136 may be configured to instruct a processing element 138 of the mobile electronic device 108 to provide the remote control interface 122. The computer-readable instructions 136 may also be configured to instruct the processing element 138 of the mobile electronic device 108 to send the commands 130 to the communication endpoint 102. Therefore, the computer-readable instructions 136 may transform the mobile electronic device 108 from a conventional mobile electronic device that is not capable of serving as a remote control device for the communication endpoint 102 into a remote control device for the communication endpoint 102.

In some embodiments, the computer-readable instructions 136 may include one or more software applications configured for execution in a mobile operating system environment (e.g., IOS, Android, etc.). In some embodiments, the computer-readable instructions 136 may include one or more web applications configured for execution through web browsing software of the mobile electronic device 108.

While executing the computer-readable instructions 136, the mobile electronic device 108 may be configured to send the commands 130 to the communication endpoint 102 via a private network responsive to user 118 interacting with the remote control interface 122 (e.g., a graphical user interface). As used herein, the terms "private network" and "private networks" refer to communication networks that enable communications between devices in a limited geographical area (e.g., personal area networks, local area networks, etc.). Examples of private networks include, among other things, wired and wireless local area networks (e.g., Ethernet and Wi-Fi networks), line of site wireless networks (e.g., Bluetooth, Zigbee, infrared communications, other radio frequency communications, optical communications, super high frequency light communications, millimeter wave communications, etc.), and wired point-to-point interfaces (e.g., serial interfaces, firewire interfaces, etc.) Accordingly, when the mobile electronic device 108 transmits command signals 130 to the communication endpoint 102, the mobile electronic device 108 and the communication endpoint 102 may both be located at the same near-end location (i.e., a location where the communication endpoint 102 is present).

The communication endpoint 102 may be configured to enable the user 118 to participate in communication sessions for audibly impaired users with far-end users 114 of far-end communication endpoints 104. As used herein, the term "far-end" refers to geographic locations remote from the near-end location, usually outside of the reach of the private network that enables the mobile electronic device 108 to transmit the command signals 130 to the communication endpoint 102. Although the term "far-end" is used to describe all of the far-end communication endpoints 104, not all of the far-end communication endpoints 104 may be located at the same far-end locations as others of the far-end communication endpoints 104. Similarly, the far-end audio endpoints 110 may be located at different far-end locations. These far-end communication endpoints 104 and far-end audio endpoints 110 are considered to be located in the "far-end" because one or more wide area networks (e.g., the internet, mobile wireless networks, PSTNs, etc.) may be used to transmit communications between the communication endpoint 102 and the far-end endpoint (e.g., far-end communication endpoints 104, far-end audio endpoints 110.

During communication sessions between the communication endpoint 102 and one or more of the far-end communication endpoints 104, non-audible signals 132 corresponding to non-audible communications may be transmitted between the communication endpoint 102 and the far-end communication endpoints 104. Voice signals 134 (sometimes referred to herein as "voice" 134) corresponding to audible communications may also be transmitted between the communication endpoint 102 and the far-end communication endpoint 104 so that the user 118 and the far-end users 114 may take advantage of any audible capabilities (e.g., speech and hearing capabilities) that they may have. As the far-end communication endpoints 104 are located remotely from the near-end location, the non-audible signals 132 and the voice 134 transmitted between the communication endpoint 102 and the far-end communication endpoints 104 may be transmitted at least partially through wide-area networks (WANs) (e.g., interne protocol (IP) networks, mobile wireless networks, publicly switched telephone networks (PSTNs), other WANs, combinations thereof, etc.).

In some embodiments, the non-audible signals 132 may include video data. Accordingly, the communication endpoint 102 and the far-end communication endpoints 104 may each include video endpoints (e.g., video phones for audibly impaired users). In such embodiments, the non-audible signals 132 may include data corresponding to video images of the user 118 and the far-end users 114 communicating using gestures (e.g., American Sign Language (ASL)).

In some embodiments, the non-audible signals 132 may correspond to text-based communication data. Accordingly, the communication endpoint 102 and the far-end communication endpoints 104 may each include text-captioned endpoints. In such embodiments, the non-audible signals 132 may include data corresponding to text inputted into the communication endpoint 102 and the far-end communication endpoints 104 by the user 118 and the far-end users 114, respectively.

In some embodiments, the non-audible signals 132 may include both video data and text data. It is also contemplated that the non-audible signals 132 may include data corresponding to non-audible communications other than video data and text data. The non-audible signals 132 may include data corresponding to any non-audible communications that may be converted to communication signals. Where a capability for converting a particular form of non-audible communication into a communication signal may be implemented with the communication endpoint 102, the disclosure likewise contemplates communication sessions between the communication endpoint 102 and the far-end communication endpoints 104 using this non-audible communication.

The communication sessions between the communication endpoint 102 and far-end communication endpoints 104 may be administered by a session server 109 of the communication system 100. The session server 109 may be configured to communicate with the communication endpoint 102 and the far-end communication endpoints 104 (e.g., using IP networks). In some embodiments, the session server 109 may relay communication session initiation requests from the communication endpoint 102 and the far-end communication endpoints 104, provide session event notifications to the communication endpoint 102 and the far-end communication endpoints 104, assist in arranging communications between the communication endpoint 102 and the far-end communication endpoints 104, other session administration acts, or combinations thereof. By way of non-limiting example, the session server 109 may be configured to administer video communication sessions between the communication endpoint 102 and the far-end communication endpoints 104 using a session initiation protocol (SIP), an H.323 protocol, or other suitable protocol.

Some of the functions of the communication endpoint 102 that the remote control interface 122 of the mobile electronic device 108 enables the user 118 to control may be related to these communication sessions. As previously discussed, the functions of the communication endpoint 102 that the remote control interface 122 enables the user 118 to control may include dialing and placing outgoing requests for communication sessions (e.g., placing calls), responding to incoming requests for communication sessions (e.g., accepting or rejecting incoming calls), terminating ongoing communication sessions (e.g., hanging up), transferring ongoing communication sessions from one of the at least one communication endpoints 102 to another of the at least one communication endpoints 102, other functions, and combinations thereof.

Some of the functions of the communication endpoint 102 that the remote control interface 122 of the mobile electronic device 108 enables the user 118 to control may include in-call functions. For example, in embodiments where the communication endpoint 102 is configured to participate in video communication sessions, the in-call functions may include video-specific functions. The video-specific functions may include video display functions and video capture functions. By way of non-limiting example, the video display functions may include pan adjustment, zoom adjustment, saturation adjustment, brightness adjustment, color adjustment, other video display functions, and combinations thereof. Also by way of non-limiting example, the video capture functions may include pan adjustment, zoom adjustment, saturation adjustment, focus adjustment, brightness adjustment, color adjustment, camera activation and deactivation, and other video capture functions.

In some embodiments, the functions of the communication endpoint 102 that the remote control interface 122 of the mobile electronic device 108 enables the user 118 to control may include functions that enable the user to access a contacts list associated with the communication endpoint 102. By way of non-limiting example, the remote control interface 122 may be configured to enable the user 118 to view and/or edit (e.g., add, change, and delete contacts and contact information) the contacts list.

In some embodiments, the remote control interface 122 may enable the user to customize settings and operational modes of the communication endpoint 102. For example, the remote control interface 122 may be configurable to present user-specific options to restrict certain functions to specific kinds of users (e.g., a senior citizen user, a child user, an administrator user, a guest user, etc.). By way of non-limiting example, the remote control interface 122 may limit the options presented to just placing and receiving calls with the communication endpoint 102 when operating in a senior citizen mode. Also by way of non-limiting example, the remote control interface 122 may not present options for calling emergency services (e.g., 211) when operating in a child mode.

In some embodiments, the communication endpoint 102 may include a video endpoint capable of communicating with text as well as video. These video endpoints may enable users to interact with text input fields for sharing text during video communication sessions, and saving text for use during the video communication sessions. Non-limiting examples of such video endpoints are disclosed in U.S. patent application Ser. No. 14/075,968, entitled "APPARATUSES AND METHODS FOR OPERATING A COMMU- NICATION SYSTEM IN ONE OF A TONE MODE AND A TEXT MODE," filed Nov. 8, 2013, and U.S. patent application Ser. No. 14/543,706, entitled "VIDEO ENDPOINTS AND RELATED METHODS FOR TRANSMITTING STORED TEXT TO OTHER VIDEO ENDPOINTS," filed Nov. 17, 2014, the entire disclosures of both of which are hereby incorporated herein by this reference. Text input, sharing, and saving functions of these video endpoints may be some of the functions that the user 118 may control using the remote control interface 122 of the mobile electronic device 108.

The communication system 100 may further include a relay service 106. The relay service 106 may be configured to provide translation between voice communications corresponding to voice signals 134 from far-end audio endpoints 110 (e.g., conventional or cellular telephone devices) and non-audible communications of non-audible signals 132 from the communication endpoint 102. The relay service 106 may include a server-side communication endpoint 126 capable of participating in communication sessions with the communication endpoint 102, similarly to the far-end communication endpoints 104 (e.g., via non-audible signals 132, and in some embodiments, voice 134). The relay service 106 may also include a server-side audio endpoint 128 capable of participating in voice communication sessions (e.g., conventional or cellular telephone communication sessions) with the far-end audio endpoints 110.

In some embodiments, a human call assistant 116 at the relay service 106 may assist in the translation between voice communications of the voice signal 134 and non-audible communications from the non-audible signals 132. By way of non-limiting example, the communication endpoint 102 may transmit non-audible signals 132 including data corresponding to video images captured by the communication endpoint 102 of the user 118 communicating with ASL to the server-side communication endpoint 126. The server-side communication endpoint 126 may present the video images of the user 118 communicating with ASL to the call assistant 116. The call assistant 116 may vocally speak a voice translation of the ASL. The server-side audio endpoint 128 may convert the call assistant's speech into voice signals 134, and transmit the voice signals 134 to a far-end audio endpoint 110. The far-end audio endpoint 110 may convert the voice signals 134 into acoustic waves for a far-end audibly capable user 120 to hear. The far-end audibly capable user 120 may speak, and the far-end audio endpoint 110 may convert the speech to voice signals 134 and transmit the voice signals 134 to the server-side audio endpoint 128. The server-side audio endpoint 128 may convert the voice signals 134 to acoustic waves for the call assistant 116 to hear. The call assistant 116 may translate the speech to ASL, and the server-side communication endpoint 126 may capture video images of the call assistant 116 communicating in ASL. The server-side communication endpoint 126 may transmit non-audible signals 132 including data corresponding to the video images of the call assistant 116 communicating in ASL to the communication endpoint 102. The communication endpoint 102 may display the video images of the call assistant 116 communicating in ASL to the user 118 of the communication endpoint 102. In this way, the user 118 of the communication endpoint may communicate with the hearing-capable user 120 of the far-end audio endpoint 110 despite audible impairments of the user 118.

Although not illustrated in FIG. 1, the relay service 106 may also be called upon for assistance in communication sessions between the communication endpoint 102 and the far-end communication endpoints 104. By way of non-limiting example, in video communications, a far-end user 114 of a far-end communication endpoint 104 may be only partially ASL capable, or not ASL capable at all. The relay service 106 may provide translation services between ASL communications of the user 118 and the far-end audibly capable user 120, as needed.

Some of the functions of the communication endpoint 102 that the remote control interface 122 of the mobile electronic device 108 enables the user 118 to control may include functions for requesting assistance from and interacting with the relay service 106. By way of non-limiting example, the remote control interface 122 may present options for requesting assistance from the relay service 106 before or while placing an outgoing call to far-end audio endpoints 110, far-end communication endpoints 104, or both. Also by way of non-limiting example, the remote control interface 122 may present options for requesting assistance from the relay service 106 while a communication session is in progress between the communication endpoint 102 and either a far-end audio endpoint 110 or a far-end communication endpoint 104.

As a further example, the remote control interface 122 may present options that enable the user 118 to control, without intervention from the call assistant 116 at the relay service 106, communications (e.g., initiating and terminating communications, putting communications on hold, etc.) between the communication endpoint 102 and the relay service 106, between the relay service 106 and the far-end audio endpoint 110, between the relay service 106 and far-end communication endpoints 104, and combinations thereof. Communication endpoints that provide users control over these communications are disclosed in U.S. patent application Ser. No. 13/838,718 to Barton et al., filed on Mar. 15, 2013, now published as U.S. Patent Publication No. 2014/0270100 (hereinafter "Barton"), and U.S. patent application Ser. No. 14/253,413 to Montero et al., filed on Apr. 15, 2014, and now published as U.S. Patent Publication No. 2014/0267579 (hereinafter "Montero"), the entire disclosures of which are hereby incorporated herein by this reference. The remote control interface 122 may enable the user 118 to control these functions of the communication endpoints disclosed by Barton and Montero.

Several specific functions of the communication endpoint 102 that may be controlled by the user 118 through user interactions with the remote control interface 122 of the mobile electronic device 108 have been identified herein. The scope of the disclosure is not, however, limited to those specific functions identified herein. For any user-controlled functions of communication endpoints that are known in the art, the remote control interface 122 may be configured to provide options to the user 118 to control such functions. Furthermore, it is contemplated that control over functions of communication endpoints that are hitherto not known in the art or are yet to be discovered may be written into the computer-readable instructions 136 that are stored at the software distribution server 112 and distributed to the mobile electronic device 108. In this way, the communication system 100 may be adaptable to provide remote control over functions of the communication endpoint 102 as these functions are discovered and implemented.

In some embodiments, the remote control interface 122 of the mobile electronic device 108 may provide for integration with third-party software tools (e.g., Google Maps, social media, etc.). By way of non-limiting example, application programming interfaces (APIs) may be provided (e.g., in the computer-readable instructions 136, implemented by servers, or combinations thereof) to enable the user 118 to access information from these third-party software tools using the communication endpoint 102. By way of non-limiting example, the remote control interface 122 may enable the user to browse content from these third-party software tools, and send the content to (or have the content sent by a server to) the communication endpoint 102 (e.g., using a unique identifier of the communication endpoint 102, such as, for example a telephone number of the communication endpoint 102). The user 118 may browse the content received by the communication endpoint 102 using the communication endpoint 102. Information from these third-party software tools may also be shared with far-end users 114 of the far-end communication endpoints 104 during communication sessions between the communication endpoint 102 and the far-end communication endpoints 104.

In some embodiments, the communication system 100 may include an authentication server 107. The authentication server 107 may be configured to communicate with the mobile electronic device 108. The mobile electronic device 108 may be configured to transmit a request to the authentication server 107 requesting permission to control the functions of the communication endpoint 102. By way of non-limiting example, the request may include user name information, password information, trusted device identification information, other information, or combinations thereof. Thus, the authentication server 107 may be configured to determine whether to grant the mobile electronic device 108 permission to control the functions of the communication endpoint 102. In other words, the authentication server 107 may be configured to verify that the user 118 is an authorized user of the communication endpoint 102. The authentication server 107 may be configured to transmit a granting communication to the mobile electronic device 108 if the request meets predefined criteria. The granting communication may grant the mobile electronic device 108 permission to control the functions of the communication endpoint 102. The authentication server 107 may also be configured to transmit a denying communication to the mobile electronic device 108 if the request does not meet the predefined criteria. The denying communication may deny the mobile electronic device 108 permission to control the functions of the communication endpoint 102. By way of non-limiting example, the predefined criteria may include a requirement for the request to include a valid user name and password, a trusted device identification, other information, and combinations thereof.

In some embodiments, the communication endpoint 102 may itself include a user interface 124 configured to enable the user 118 to control the functions through interactions with the communication endpoint 102. In such embodiments, the remote control interface 122 of the mobile electronic device 108 may serve as a convenience for the user 118. For example, the mobile electronic device 108 may be within the reach of the user 118 and the user interface 124 may be outside of the reach of the user 118 when the user 118 desires to control the functions of the communication endpoint 102. Also, the mobile electronic device 108 may provide a more user-friendly input and/or output mechanisms for interacting with the remote control interface 122 than is provided for interacting with the user interface 124 of the communication endpoint 102. By way of non-limiting example, the mobile electronic device 108 may include a touchscreen device that enables convenient interaction with text input fields (e.g., using virtual keyboards), drag and drop, and touch to select and swipe to move user inputs. Also, the mobile electronic device 108 may include one or more sensors (e.g., a camera) capable of detecting gestures as inputs.

In some embodiments, the scope of the functions that are controllable by the user interface 124 may exceed the scope of the functions that are controllable by the remote control interface 122. In some embodiments, the scope of the functions controlled by the user interface 124 may be the same as, or substantially the same as, the scope of the functions controlled by the remote control interface 122. In some embodiments, the user interface 124 and the remote control interface 122 may be substantially identical. In some embodiments, the remote control interface 122 may be integrated with the user interface 124, and the user 118 may be enabled to interact with options and menus presented by the user interface 124 by making selections on the remote control interface 122. In some embodiments, the remote control interface 122 may enable the user 118 to control the functions of more than one of the at least one communication endpoints 102 with a single device.

In some embodiments, the remote control interface 122 may serve as a primary (e.g., sole) interface for the user 118 to control the functions of the communication endpoint 102. In some embodiments, the scope of the functions that are controllable by the user interface 124 of the communication endpoint 102 may be less than the scope of the functions that are controllable by the remote control interface 122 of the mobile electronic device 108. In some embodiments, the communication endpoint 102 may not include a separate user interface 124.

Figure 2:
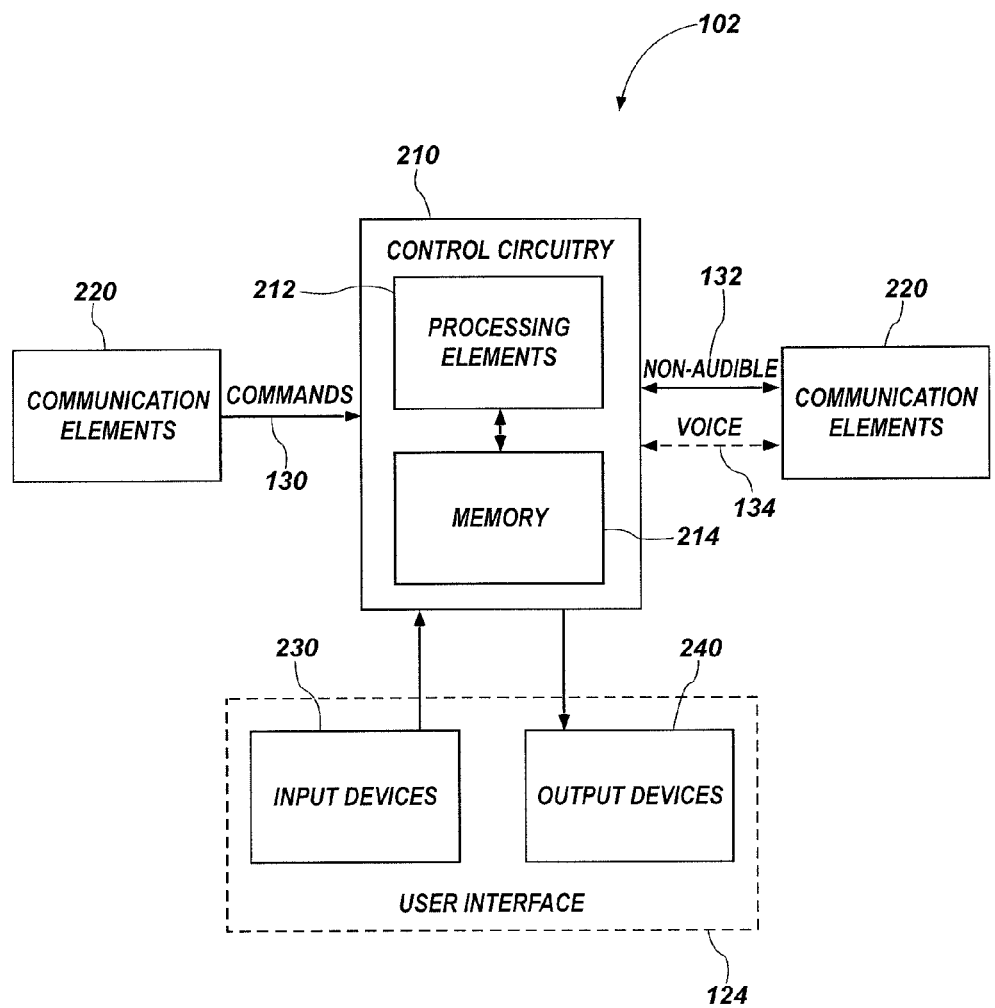
FIG. 2 is a simplified block diagram of the communication endpoint of the communication system of FIG. 1.

FIG. 2 is a simplified block diagram of the communication endpoint 102 of the communication system 100 of FIG. 1. The communication endpoint 102 may include control circuitry 210 operably coupled to communication elements 220. The control circuitry 210 is configured to control operations of the communication endpoint 102. The communication elements 220 may include communication interfaces configured to enable the communication endpoint 102 to communicate with the mobile electronic device 108, the far-end communication endpoints 104, the relay service 106, and the session server 109. Accordingly, the communication elements 220 may include Wi-Fi®, Bluetooth®, Zigbee®, radio, optical, infrared, super high frequency light, Ethernet, serial, Firewire® communication interfaces, a mobile wireless communication interface, a PSTN interface, other communication interfaces, or combinations thereof.

The control circuitry 210 may be configured to send and receive non-audible signals 132 and voice 134 to and from the far-end communication endpoint 104 through the communication elements 220. The control circuitry 210 may also be configured to receive commands 130 from the mobile electronic device 108 through the communication elements 220 responsive to the user 118 interacting with the remote control interface 122 of the mobile electronic device 108. The control circuitry 210 may be configured to execute functions of the communication endpoint 102 corresponding to the commands 130 received from the mobile electronic device 108. In this way, the user 118 may remotely control the communication endpoint 102 using the remote control interface 122 of the mobile electronic device 108.

In some embodiments, the communication endpoint 102 may include a user interface 124 configured to enable the user 118 to control the functions of the communication endpoint 102. The user interface 124 may include one or more input devices 230 (e.g., an IR remote control, a mouse, a keyboard, a button array, combinations thereof, etc.) and one or more output devices 240 (e.g., an integrated digital display, a separate digital display, discrete light emitting diodes (LEDs), other output devices, combinations thereof, etc.). The control circuitry 210 may be configured to execute the functions responsive to user 118 interactions with the user interface 124, as well as responsive to the commands 130 received from the mobile electronic device 108.

In some embodiments, the communication endpoint 102 may include a video communication endpoint (e.g., a video phone for audibly impaired users). In such embodiments, the communication endpoint 102 may include video equipment (e.g., a video camera, a digital display, etc.) to enable video communications. This video equipment may be implemented together with, or separate from, the input devices 230 and the output devices 240 of the user interface 124. By way of non-limiting example, the same electronic display that presents the user interface 124 may also present video images received from a far-end communication endpoint 104 (FIG. 1). Also by way of non-limiting example, a camera used for optically detecting user inputs for the user interface 124 may also be used to capture video images that are then sent to a far-end communication endpoint 104.

Figure 3:
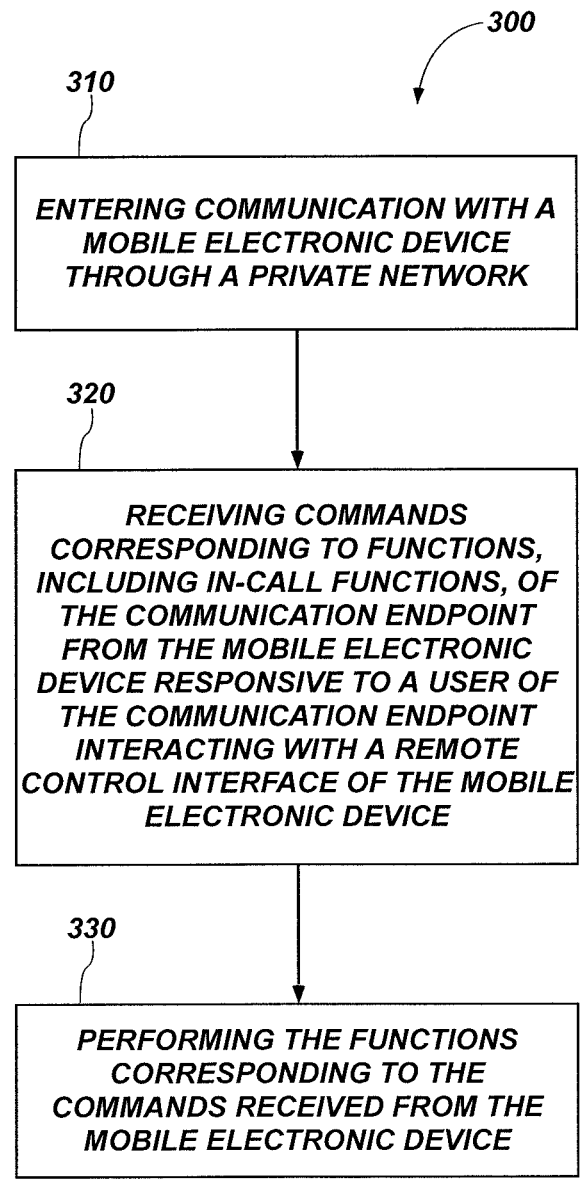
FIG. 3 is a flowchart illustrating a method of operating the communication endpoint of FIGS. 1 and 2.

FIG. 3 is a flowchart 300 illustrating a method of operating the communication endpoint 102 of FIGS. 1 and 2. Referring to FIGS. 1 through 3 together, at operation 310, the method may include communicating with a mobile electronic device 108 in a same near-end location as the video endpoint through a private network. The mobile electronic device 108 may be configured to provide a remote control interface 122 configured to control functions of the communication endpoint 102, including in-call functions. The mobile electronic device 108 may also be configured to transmit commands 130 corresponding to the one or more functions to the communication endpoint 102 responsive to a user 118 of the communication endpoint 102 interacting with the remote control interface 122 of the mobile electronic device 108.

At operation 320, the method may include receiving one or more of the commands 130 corresponding to one or more of the functions of the communication endpoint 102 from the mobile electronic device 108 responsive to the user 118 interacting with the remote control interface 122. In some embodiments, receiving one or more of the commands 130 includes receiving a command directing the communication endpoint 102 to execute the in-call functions. The in-call functions may include controlling video display functions, and controlling video capture functions. In some embodiments, receiving one or more of the commands 130 includes receiving a command directing the communication endpoint 102 to request assistance from a relay service 106, present/edit contacts lists, change/customize operational modes, send/store text during/for a video communication session, access information from third-party software tools (e.g., social media, Google Maps, etc.), other functions, and combinations thereof.

At operation 330, the method may include performing the functions corresponding to the commands 130 received from the mobile electronic device 108 responsive to receiving the commands 130.

Figure 4:
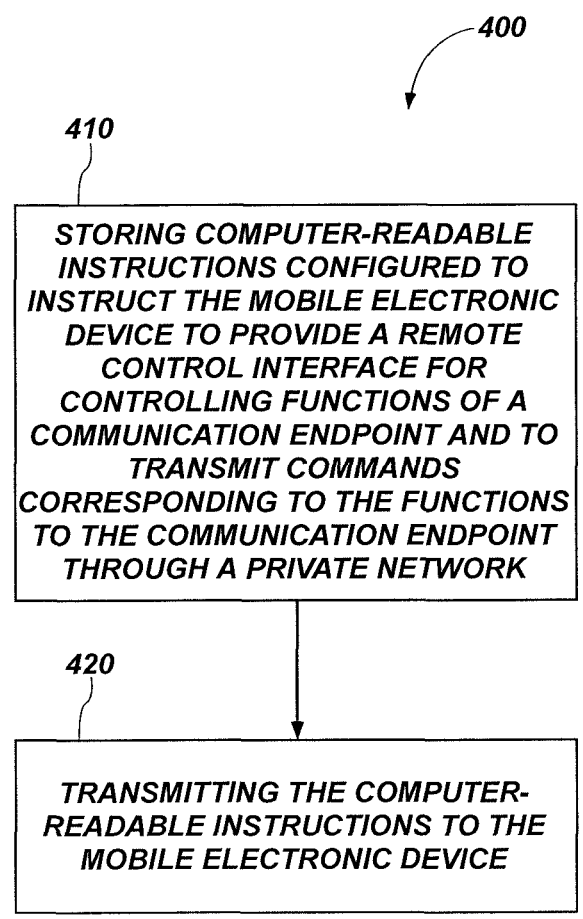
FIG. 4 is a flowchart illustrating a method of transforming the mobile electronic device of the communication system of FIG. 1 into a remote control device for the communication endpoint of FIGS. 1 and 2.

FIG. 4 is a flowchart 400 illustrating a method of transforming the mobile electronic device 108 of the communication system 100 of FIG. 1 into a remote control device for the communication endpoint 102 of FIGS. 1 and 2. At operation 410, the method may include storing computer-readable instructions 136 on a data storage device 140 of a software distribution server 112. The computer-readable instructions 136 may be configured to instruct the mobile electronic device 108 to provide a remote control interface 122 for controlling functions of a communication endpoint 102. The computer-readable instructions 136 may also be configured to instruct the mobile electronic device 108 to transmit commands 130 corresponding to the functions to the communication endpoint 102 responsive to a user 118 of the mobile electronic device 108 interacting with the remote control interface 122.

At operation 420, the method may include transmitting the computer-readable instructions 136 to the mobile electronic device 108.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video endpoint configured to enable an audibly impaired user to participate in a video communication session, the video endpoint comprising:
   one or more communication elements configured to:
      communicate with a remote video relay service configured to establish a video communication session with a far-end communication endpoint and provide translation services during the video communication session; and
      receive, through a local network, commands corresponding to functions of the video endpoint from a mobile electronic device located at a same near-end location as the video endpoint responsive to a user of the video endpoint interacting with a remote control interface of the mobile electronic device;
   an image capturing device configured to capture video images for transmission to the video relay service during the video communication session, and
   control circuitry operably coupled with the one or more communication elements and the image capturing device, and configured to execute the functions of the video endpoint that correspond to the commands responsive to receiving the commands from the mobile electronic device, wherein the functions include in-call functions for controlling the video endpoint during the video communication session including at least one video capture function selected from the group consisting of pan adjustment, zoom adjustment, saturation adjustment, focus adjustment, brightness adjusting, color adjustment, activation of the image capturing device, and deactivation of the image capturing device.

2. The video endpoint of claim 1, further comprising a video display device operably coupled with the control circuitry, wherein the in-call functions further include video display functions.

3. The video endpoint of claim 2, wherein the video display functions include at least one video display function selected from the group consisting of pan adjustment, zoom adjustment, saturation adjustment, brightness adjustment, and color adjustment for video displayed on the video display device during the video communication session.

4. The video endpoint of claim 1, wherein the control circuitry is configured to provide a user interface configured to enable the user to control at least a portion of the functions of the video endpoint.

5. The video endpoint of claim 1, wherein the in-call functions further include transmitting text from the video endpoint to the far-end communication endpoint during the video communication session with the far-end communication endpoint.

6. The video endpoint of claim 1, wherein the in-call functions further include storing text in system data storage device of the video endpoint that can later be transmitted to the far-end communication endpoint during a later video communication session with the far-end communication endpoint.

7. The video endpoint of claim 1, wherein the control circuitry is further configured to enable the user to participate in text-captioning communication sessions.

8. The video endpoint of claim 1, wherein the in-call functions further include transmitting a request for communication assistance to the video relay service during the communication session.

9. The video endpoint of claim 1, wherein the functions further include at least one of presenting and editing a contacts list associated with the video endpoint.

10. A method of operating a video endpoint configured to enable an audibly impaired user of the video endpoint to participate in communication sessions, the method comprising:
    communicating with a remote video relay service for establishing a communication session with a far-end communication endpoint the video relay service providing translation service for the audibly-impaired user during the communication session;
    capturing video images using an image capturing device of the video endpoint and transmitting the video images to the remove video relay service during the communication session;
    communicating with a mobile electronic device in a same near-end location as the video endpoint through a local network during the communication session;
    receiving commands from the mobile electronic device responsive to the audibly-impaired user of the video endpoint interacting with a remote control interface of the mobile electronic device, the commands corresponding to functions of the video endpoint; and
    performing the functions corresponding to the commands from the mobile electronic device responsive to receiving the commands, wherein the functions include in-call functions for controlling the video endpoint during the communication session including at least one video capture function selected from the group consisting of pan adjustment, zoom adjustment, saturation adjustment, focus adjustment, brightness adjustment, color adjustment, activation of the image capturing device, and deactivation of the image capturing device.

11. The method of claim 10, wherein performing the functions responsive to receiving the commands comprises presenting information received from a third-party software tool executable from computer-readable instructions stored in system data storage device through an application program interface.

12. The method of claim 11, wherein presenting the information received from the third-party software tool comprises presenting social media information received from a social media website.

13. A video phone configured to enable an audibly impaired user to participate in video communication sessions, the video phone comprising:
    video equipment configured to enable video, communication during the video communication sessions,
    one or more communication elements configured to:
        transmit and receive video communications to and from a remote video relay service configured to provide translation services for translating the video communications from the video phone to voice communications to enable the audibly impaired user of the video phone to participate in video communication sessions with audibly capable users of audio endpoints; and
        receive, through a wireless connection with a mobile electronic device located at a same near-end location as the video phone, commands corresponding to in-call functions of the video phone responsive to a user of the video phone interacting with a remote control graphical user interface of the mobile electronic device; and
    control circuitry operably coupled with the video equipment and the one or more communication elements, the control circuitry configured to execute the in-call functions of the video endpoint during the video communication session, wherein the in-call functions for controlling the video endpoint during the communication session including at least one video capture function of the video equipment selected from the group consisting of pan adjustment, zoom adjustment, saturation adjustment, focus adjustment, brightness adjustment, color adjustment, activation of video equipment, and deactivation of the video equipment.

14. The video phone of claim 13, wherein the wireless connection includes at least one of a local area network connection or a line of sight connection.

15. The video phone of claim 14, wherein the line of sight connection includes at least one of a Bluetooth connection, a Zigbee connection, an infrared connection, an RF connection, an optical connection, a light connection, or a millimeter wave connection.

16. A video communication system comprising:
    a video relay service configured to provide sign language interpretive services during communication sessions between audibly-impaired users and audibly-capable users; and
    at least one video communication device and a mobile electronic device associated with at least one audibly-impaired user, wherein:
        the mobile electronic device is configured to transmit commands to the at least one video communication device during an established communication session between the at least one video communication device, the video relay service, and a far-end communication device associated with an audibly-capable user; and
        the at least one video communication device is configured to execute in-call functions for controlling the at least one video communication device during the established communication session responsive to receiving commands from the mobile electronic device, wherein the in-call functions for controlling the at least one video communication device during the established communication session including at least one video capture function selected from the group consisting of pan adjustment, zoom adjustment, saturation adjustment, focus adjustment, brightness adjustment, color adjustment, activation of the image capturing device, and deactivation of an image capturing device of the at least one video communication device.

17. The video communication system of claim 16, wherein the mobile electronic device is selected from the group consisting of a smart phone, a tablet computer, and a laptop computer.

18. The video communication system of claim 16, wherein the mobile electronic device includes a software application stored thereon as computer-readable instructions in system data storage device that, when executed by a processor of the mobile electronic device, enables the user to input the commands through a touchscreen interface of the mobile electronic device.

19. The video communication system of claim 18, wherein the software application is configured to access information from at least one third party software application stored as computer-readable instructions on the mobile electronic device.

20. The video communication system of claim 19, wherein the mobile electronic device is further configured to send the information from the at least one third party software application to the at least one video communication device with at least one audibly-impaired user.

21. The video communication system of claim 16, wherein the mobile electronic device is further configured to enable control of different functions thereof that are controllable from the mobile electronic device depending on a different user operating the video communication device.

* * * * *